United States Patent
Nevis et al.

(10) Patent No.: US 7,272,242 B2
(45) Date of Patent: Sep. 18, 2007

(54) OBJECT DETECTION IN ELECTRO-OPTIC SENSOR IMAGES

(75) Inventors: Andrew J. Nevis, Panama City, FL (US); James F. Bryan, Lynn Haven, FL (US); Brett W. Cordes, Panama City Beach, FL (US); James S. Taylor, Panama City Beach, FL (US); Mary C. Hulgan, Lynn Haven, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 640 days.

(21) Appl. No.: 10/834,155

(22) Filed: Apr. 26, 2004

(65) Prior Publication Data
US 2005/0238199 A1    Oct. 27, 2005

(51) Int. Cl.
*G06K 9/00* (2006.01)

(52) U.S. Cl. .................. 382/103; 382/299; 348/25; 345/177

(58) Field of Classification Search ............... 382/103, 382/106, 107, 108, 123, 168, 172, 173, 194, 382/199, 203, 213, 232, 276, 256, 274, 321, 382/305, 291–299; 356/3.07; 345/177; 348/25; 700/83; 367/15; 250/208.1
See application file for complete search history.

(56) References Cited

U.S. PATENT DOCUMENTS

| 4,465,940 | A  | * | 8/1984  | Graff et al. ............... 348/25 |
| 4,843,597 | A  | * | 6/1989  | Gjessing et al. ............ 367/15 |
| 5,583,446 | A  | * | 12/1996 | Takeuchi et al. ........... 324/754 |
| 6,108,457 | A  | * | 8/2000  | Nevis .................... 382/274 |
| 6,320,176 | B1 | * | 11/2001 | Schofield et al. ........ 250/208.1 |
| 6,970,578 | B1 | * | 11/2005 | Strand ................... 382/103 |
| 7,006,881 | B1 | * | 2/2006  | Hoffberg et al. ............ 700/83 |
| 7,061,475 | B2 | * | 6/2006  | Kent ..................... 345/177 |

\* cited by examiner

*Primary Examiner*—Seyed Azarian
(74) *Attorney, Agent, or Firm*—James T. Shepherd

(57) ABSTRACT

A method of object detection in an image uses a background anomaly approach that searches for anomalies of a particular size and shape that are distinguishable from the image's local background. Included is a geometric classifier used to distinguish regularly-shaped objects from irregularly-shaped objects.

13 Claims, 2 Drawing Sheets

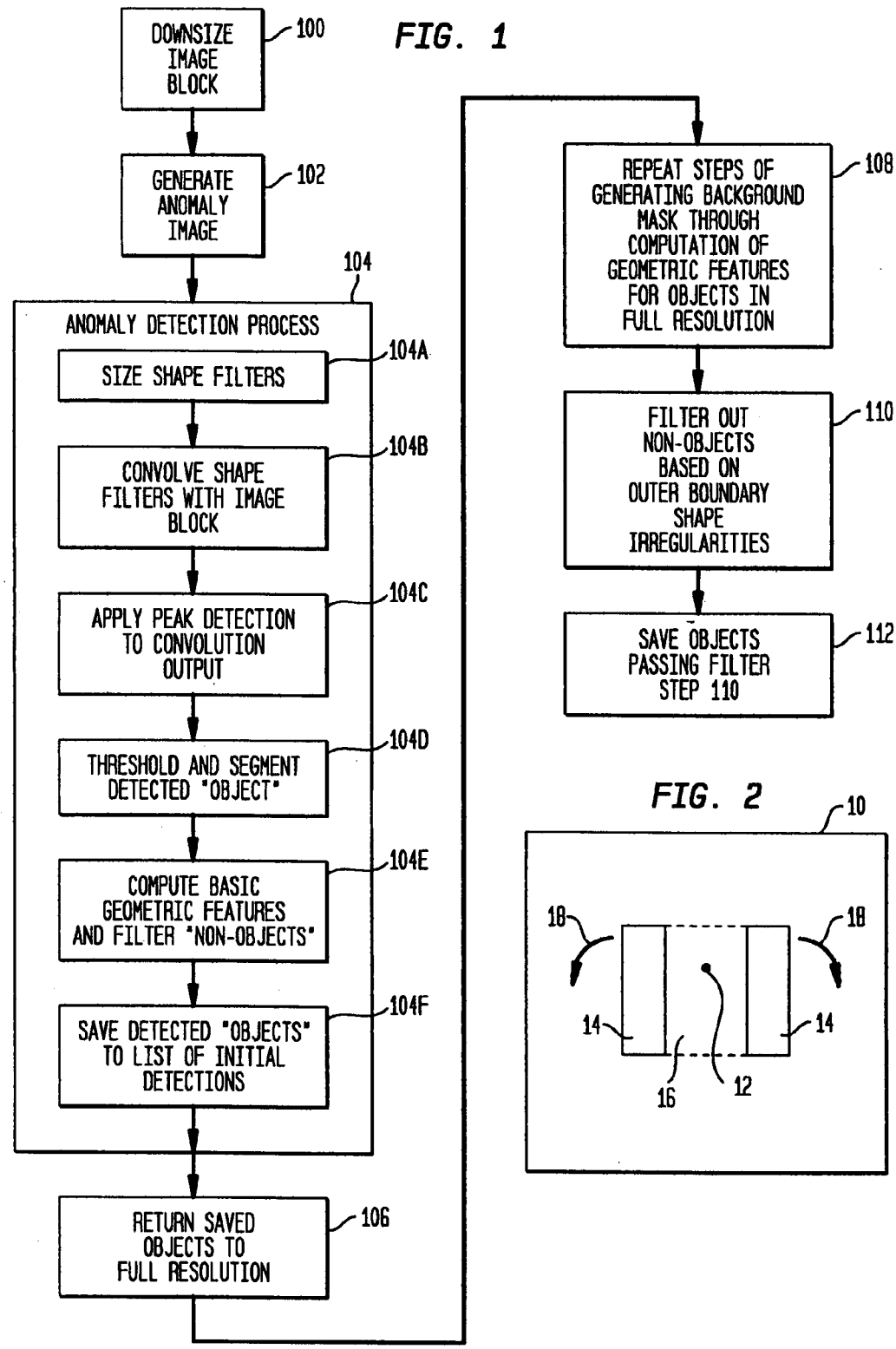

OBJECT DETECTION IN ELECTRO-OPTIC SENSOR IMAGES

ORIGIN OF THE INVENTION

The invention described herein was made in the performance of official duties by an employee of the Department of the Navy and may be manufactured, used, licensed by or for the Government for any governmental purpose without payment of any royalties thereon. Pursuant to 35 U.S.C. §119, the benefit of priority from provisional application No. 60/464,308, with a filing date of Apr. 22, 2003, is claimed for this non-provisional application.

FIELD OF THE INVENTION

The invention relates generally to image processing, and more particularly to a method of detecting objects of interest in electro-optic sensor images.

BACKGROUND OF THE INVENTION

Electro-optic identification (EOID) sensing systems provide photographic quality images that can be used to identify objects of interest (e.g., mines or mine-like objects) on the ocean bottom. Two of these high-resolution sensing systems are Laser Line Scan (LLS) and Streak Tube Imaging Lidar (STIL) systems. Both of these types of sensing systems are underwater imaging systems that produce high quality images. They differ in that LLS systems produce two-dimensional contrast images whereas STIL systems produce three-dimensional image data that can be rendered into two-dimensional contrast and range image maps.

To date, a human operator's manual examination of EOID images is the standard for detecting and recognizing objects of interest. However, numerous limitations and widely varying skill levels of the human operator make computer-aided identification and target recognition schemes attractive.

SUMMARY OF THE INVENTION

Accordingly, it is an object of the present invention to provide a method/system of detecting objects of interest in images generated by electro-optic sensing systems.

Another object of the present invention is to provide a method/system of detecting mine-like objects in underwater images generated by LLS or STIL systems.

Other objects and advantages of the present invention will become more obvious hereinafter in the specification and drawings.

In accordance with the present invention, a method is provided for detecting objects in an image. The method utilizes a first mask defined by two spaced-apart strip regions with a target region being defined between the two strip regions. Specifically, at each pixel, a best fit criteria is applied to a portion of the image defined by the first mask for a plurality of orientations of the first mask with the pixel being located within the target region for each of the orientations. The best fit criteria normalizes a mean square error of pixel intensities contained by the strip regions by a mean square error of pixel intensities of the target region. As a result, a least squares error estimate is generated for each orientation. A best fit is indicated by a smallest least squares error estimate. Next, at each pixel, an anomaly image is generated. The anomaly image is defined by anomaly image pixels that are in correspondence with the image's array of pixels. Each anomaly image pixel has a value defined as a difference between (i) the original value of the pixel, and (ii) the smallest least squares error estimate for that pixel generated by one of the orientations of the first mask. The anomaly image is then convolved with a second mask of a selected size and shape such that convolution values are generated across the anomaly image. An object of interest is indicated when the convolution values are greater than a threshold value in a region of the anomaly image. The anomaly image pixel associated with a greatest one of the convolution values in this region is defined as a centroid of the object of interest. The outer edges associated with the object of interest are next determined where a segmented object is defined by the outer edges with all pixels within the outer edges being assigned the same (intensity) value. The geometric features of a segmented object are determined and compared with selected threshold features to determine if the geometric features correlate with the selected threshold features.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a flow diagram of the method of detecting objects in an electro-optic system generated image in accordance with the present invention;

FIG. 2 is a pictorial representation of the background mask strips used to generate an anomaly image in accordance with the present invention;

DETAILED DESCRIPTION OF THE INVENTION

Figure 3A:
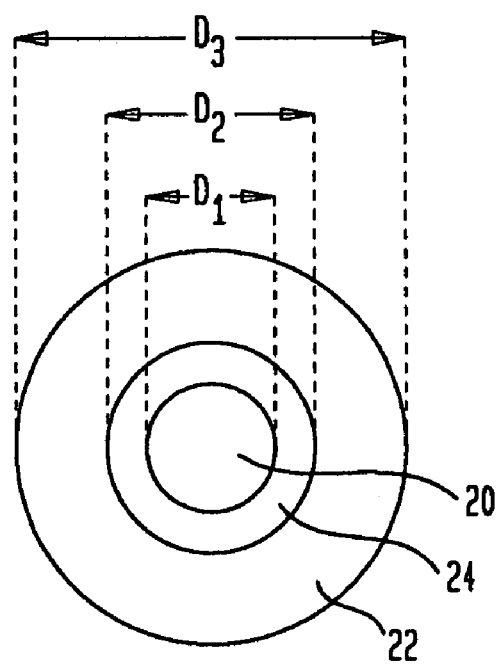
FIG. 3A is a pictorial view of a near circular shape filter used in the anomaly detection phase of the present invention.

The present invention is a computer-aided system and method that provides for the detection of objects of interest in an image generated by an EOID system such as an LLS or STIL sensing system. Prior to processing in accordance with the present invention, LLS images are enhanced as described in U.S. Pat. No. 6,097,849. Pre-processing of STIL images includes rendering of the image data into two-dimensional range and contrast images and, if necessary, enhancement of the two-dimensional range and contrast images.

In general, the present invention is a background anomaly detection scheme that searches for anomalies of certain size and shape that stick out from the image's local background. Briefly, this is accomplished by rotating spaced-apart "strips" (e.g., spaced-apart line segments or rectangular mask regions) about each of the image's pixels in order to search for the best background fit. The best background fit is defined by minimal error across the background strips thereby indicating the presence of background only within the region defined by the background strips. In contrast, maximum error over the region of interest (between the background strips) indicates the presence of object edges within the region of interest.

Once an object has been detected, a local background mask is generated about a detected object (in a region of interest) and a two-dimensional surface estimate of the background is computed that excludes the region of interest between the background strips. Each local background mask is then segmented by determining which pixels in the local background mask are close to the surface estimate (i.e., indicative of background) and which are sufficiently far from the surface estimate (i.e., indicative of an object of interest). Each detected object's centroid (i.e., pixel having the greatest value) is then used as the basis for determining the detected object's size, shape and orientation.

Since EOID sensing systems produce a very high resolution image, the first step of the present invention will typically involve downsizing of the image for purpose of performing initial detections. Applying the anomaly detection scheme on downsized imagery provides increased speed of processing and a greater flexibility when there are unknown object shapes and sizes. Objects detected in the downsized image can then be further processed using full resolution image data to yield more precise object size, shape and orientation information. Greater precision in terms of object size, shape and orientation means that additional specialized filtering techniques can be applied so that the number of false positives can be reduced. For example, in the case of searches for mine-like objects, small and/or irregularly-shaped objects (e.g., coral) can be filtered out using the more precise object detections. Note that it is to be understood that, provided sufficient processing capability is available, the present invention can be carried using full resolution images without departing from the scope of the present invention.

A more thorough description of the present invention's detection scheme will now be explained in conjunction with the flow diagram in FIG. 1. The process of the present invention can be implemented using any conventional processing hardware, the choice of which is not a limitation of the present invention. After enhancement, the image block is downsized at step 100 to facilitate initial object detections. Such downsizing of the image block could be accomplished by, for example, selecting pixels at the intersection of every fourth column and every fourth row resulting in a 16:1 downsize. However, it is to be understood that other downsizing ratios and/or methods of downsizing can be used without departing from the scope of the present invention.

The downsized image is used to generate an anomaly image at step 102 which gives a measure of how far object pixels stick out from the local background. Briefly, the anomaly image is generated by rotating spaced-apart background mask strips about each pixel in the image block in order to search for the best background fit. Pictorially, step 102 is illustrated in FIG. 2 where a downsized image bock 10 is shown with a single pixel 12 being specifically shown for purpose of this explanation. Spaced-apart background mask regions (hereinafter referred to as "background strips") 14 are defined where the size thereof and spacing therebetween are design considerations that are not limitations of the present invention. For example, strips 14 can be rectangular regions as shown. However, to reduce computational complexity and thereby increase processing speed, each of strips 14 can also be a simple line segment.

Between background strips 14 is a region of interest or target strip 16 as it will be referred to hereinafter. Strips 14 and, consequently strip 16, are rotated to a number of orientations about each pixel (e.g., pixel 12) of downsized image block 10 as indicated by arrows of rotation 18. At each such orientation, the pixels within the boundaries of strips 14 are evaluated (e.g., using a mean squared error (MSE) method explained further below) in comparison to one another to determine if homogeneous background pixels reside in each of strips 14. If this comparison yields a minimal error, a homogeneous background is assumed. In contrast, the pixels residing within target strip 16 (at the same orientation) will have a maximum error relative to background strips 14 when an object is present in target strip 16.

One suitable best background fit criteria of the rotating strips is the mean squared error (MSE) of background strips 14 normalized by the MSE of target strip 16 or Best fit criteria=min$\{MSE_{Bi}/MSE_{Ti}\}$, i=1, . . . , N where $MSE_{Bi}$ is the mean squared error of background strips 14 for orientation i and $MSE_{Ti}$ is the mean squared error of target strip 16 for orientation i. The logic behind this criteria is that background regions tend to be fairly even in intensity. Thus, the emphasis is to search for minimal background strip errors, while the target strip searches for object edges which tend to have maximal error. The corresponding anomaly value for each pixel is then the difference between the actual pixel value and the least squares error estimate of the $k^{th}$ orientation that was determined as the best fit. This process is applied for each pixel throughout the image. One or more background and target strip sizes can be used.

The next step in the detection scheme is to implement (at step 104) an anomaly detection process using downsized image block 10. The determination of anomaly detections is accomplished through a series of steps. At step 104A, a number of what are referred to herein as shape filters are sized based on the distance between the imaging system and the region being imaged. Each shape filter is a target mask designed to detect targets of assumed size and shape while being flexible enough for a range of sizes and orientations. For example, in terms of detecting (regularly-shaped) mine-like objects, two primary shapes used are near circular and cylindrical shape filters.

The near circular shape filter shown pictorially in FIG. 3A is a single filter that uses a circular target region 20 with diameter $D_1$, and an annular background region 22 with inner diameter $D_2$ and outer diameter $D_3$. Use of an expansion region 24 allows detection of near circular objects having diameters of $D_2$ or less. That is, larger near circular objects can be detected by implementing a second near circular shape filter with larger dimensions between $D_1$ and $D_2$.

Figure 3B:
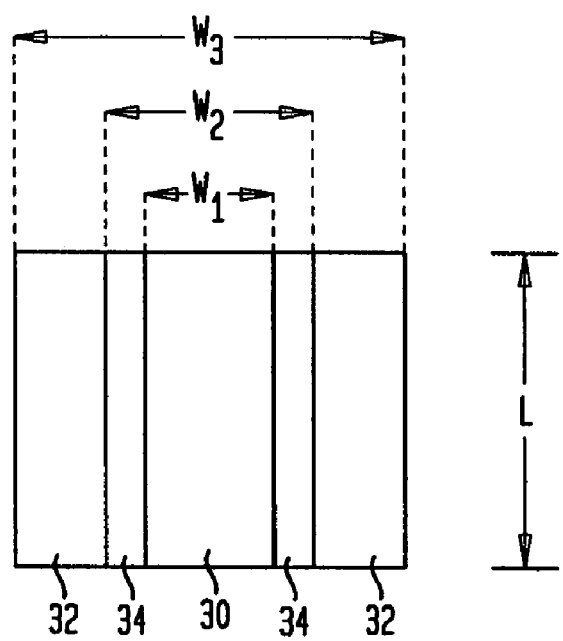
FIG. 3B is a pictorial view of a cylindrical shape filter used in the anomaly detection phase of the present invention.

A cylindrical filter shown in FIG. 3B has a rectangular target region 30 with a length L and width of $W_1$, and outer rectangular background strips 32 with a length L, and an inner width $W_2$ and an outer width $W_3$. A cylindrical shape filter is rotated in the same way that background strips 14 were rotated. To make the cylindrical shape filter flexible for size and orientation, an expansion band 34 is used between the target and background regions. Note that the cylindrical shape filter is not bounded by background regions at either end of background strips 32. This allows for detection of cylindrical objects well in excess of length L. Thus, the approach to detecting cylindrical targets is through the width orientation while leaving an open-ended length assumption.

The shape filters depicted in FIGS. 3A and 3B are used to detect differences in image intensity between the target regions and the background regions. This is accomplished by normalizing the pixel values of the target region (i.e., region 20 or 30) to sum up to a value of +1.0, and normalizing the pixel values of the background regions (i.e., regions 22 or 32) to sum up to a value of −1.0.

After sizing the selected shape filters for a target size of interest, step 104B applies the shape filters to the anomaly image by convolving the shape filters with the anomaly image. Thus, given anomaly image I and shape filter T, the output image $I_o$ from applying shape filter T to I through convolution is $$I_o = IDFT\{I_{DFT} \times T_{DFT}'\}$$

where $I_{DFT}$ is the Discrete Fourier Transform of I, $T_{DFT}$ is the Discrete Fourier Transform of T, $T_{DFT}'$ is the complex conjugate of $T_{DFT}$, and IDFT is the inverse Discrete Fourier Transform of the multiplicative product between $I_{DFT}$ and $T_{DFT}'$. The Discrete Fourier Transform (DFT) and convolution used herein are typical methodologies found in standard signal and image processing books.

The convolution output is used to identify regions (objects) within the anomaly image that match the shape filters. The peak values over these regions are where the shape filter best matches or aligns the region with the shape in the filter. The higher the peak value, the stronger the correlation between the region (object) and the shape in the shape filter. Thus, object detection can be determined by searching the convolution output at step 104C for peak values, where the pixel location of the peak value can be assumed to be the approximate object centroid. The search process is accomplished by sequentially searching all of the convolution outputs (i.e., one convolution output for each shape filter and its orientation), and taking the highest peak value as the detection in question. This process can be continued until either a maximum number of detections have been achieved or until peak values fall below a predetermined threshold value. Since the convolution process is equivalent to a moving window of the shape filter applied across the image block, the peak values tend to occur in clumps or clusters of pixels. Thus, in order to detect a single object (and not the same object repeatedly), a window mask can be applied to the convolution output about the peak value pixel location. In this way, after each initial detection, but before the next initial detection, the convolution output values are masked out in a rectangular region about the object's centroid.

Once a detection centroid has been determined, step 104D analyzes the candidate detection to determine if it is an object or non-object (where non-objects could be defined as a dark sand patch or some kind of system artifact that does not really exist in the image scene). To do so, the object's outer edges must be distinguished, or segmented as it is referred to herein, from the local background. This is accomplished by generating a background mask, which excludes the anticipated target region, about the detected object using information saved from the shape filters such as the shape filter type and orientation yielding the largest peak value. The background mask corresponding to a near circular shaped object (in the case where the peak detection value is found in the near circular convolution output) is determined by using a circular region for the excluded target region and a boxed shape area for the background region. The background mask for cylindrical shaped objects (in the case where the peak detection value is found in one of the cylindrical convolution outputs) is determined by using a rectangular region for the excluded target region in an orientation corresponding to the orientation of the particular cylindrical shape filter containing the peak detection, and a box shaped region for the background region.

To establish the excluded target region as close to the target as possible, an adaptive scheme can be used. For the near-circular mask, the excluded circular region diameter is tested to determine the smallest diameter that entirely encloses the detected object. This is accomplished by sequentially testing annulus regions about the detection centroid to search for the annulus that contains object edges. Thus, given a sequence of annulus regions $A_k$ about the detected centroid and starting from the largest annulus to the smallest annulus with corresponding standard deviation within the annulus region $S_k$, the optimal diameter $D_k$ corresponding to the annulus $A_k$ is determined by the minimum value of $S_k/S_{k+1}$. Similarly, for cylindrical masks, the width of the excluded target region is optimized by testing rectangular regions about the detected centroid for object edges. Thus, given a sequence of rectangular regions $R_k$ corresponding to widths $W_k$ and computing standard deviations $S_k$, the optimal width is the width that corresponds to the $R_k$ with minimum value of $R_k/R_{k+1}$.

Next, using the background mask region, a two-dimensional surface estimate is generated. This two-dimensional surface is estimated using a least squares error (LSE) fit on piecewise, overlapping line segments of pixels taken first along the image rows of the background mask region and then across the image columns. The two-dimensional surface extends across the target region, although no pixels from the target region are used in the LSE fit. The entire background mask region to include the target region is then separated into either object pixels or background pixels by comparing the actual pixels in the region to the two-dimensional surface estimate. If the difference in intensity between an actual pixel and the corresponding two-dimensional estimate pixel is sufficiently large, then the pixel is declared an object pixel (e.g., white). Otherwise, the pixel is declared a background pixel (e.g., black). This process is applied pixel-by-pixel throughout the entire background mask region. Following this, customized morphology routines can be applied to this binarized region to remove noise pixels and to fill in small holes within objects.

The final portion of step 104D involves establishing the edges of an object starting from the object's centroid, i.e., the peak value pixel in a target region. Starting at the peak value pixel, an outer boundary pixel is searched for based on change in intensity, e.g., from white to black. Once an outer boundary pixel has been found, a sequential (e.g., clockwise) search and enumeration process identifies all other outer boundary pixels until the initial outer boundary pixel is again reached. The outer boundary pixel locations are saved and pixels that are contained within the outer boundary pixels are designated or assigned as object pixels (e.g., pixels are assigned the same intensity value such as the intensity value indicative of white). At the same time, any previously-identified object pixel that is not an outer boundary pixel or one contained therein is designated as a background (e.g., black) pixel.

Once the object has been segmented, step 104E computes some basic geometric features to help describe the object on a fundamental level. This includes length, width, area, orientation, and true centroid since the location of the detected object's peak value pixel is an estimated centroid which may not be accurate because of the flexible shape filters. These features are computed by calculating first and second order moments about the object. Such geometric computations are well known in the art of image processing. See, for example, "Digital Image Processing, Second Edition," William K. Pratt, Wiley Interscience Publishing, 1991.

The geometric features are generated using an ellipsoid fit. However, since objects are rarely shaped as a true ellipse, it may be desirable to compute a more accurate estimate of the object's orientation, length, and width. To accomplish this, each of the opposing sides of the object is fitted with a straight line and the average slope of these two lines is used to re-compute the object's true orientation. Once the orientation has been re-computed, then the object's length is re-computed by taking a line through the object's centroid parallel to the re-computed orientation, and the object's width is re-computed by taking the line through the object's centroid perpendicular to the re-computed orientation. The re-computed length and width corresponding to this calculation represent one way to estimate the true length and width. Another way is to estimate an averaged length and width by taking the average lengths and widths from multiple parallel and perpendicular lines spanning the object.

Once the basic geometric features have been computed, measures can be generated to help filter the initial object detections before continuing with full resolution detection. The method used in the present invention filters initial object detections by computing a detection threshold measure $D_{tm}$ that is a function of an object's area, length, and width. A variety of threshold measurements can be used without departing from the scope of the present invention. By way of illustrative example, one such threshold measure is given as $$D_{tm}=A_o/A_t \times L_o/L_t \times W_o/W_t$$

where $A_o$, $L_o$, and $W_o$ are a detected object's area, averaged length, and averaged width, respectively, and $A_t$, $L_t$, and $W_t$ are user-supplied threshold values for the area, length and width. An object is then filtered or removed from the detection list if $D_{tm}$ is less than some predetermined threshold value. Any "object" that passes to this stage has its centroid, orientation, length, and width saved at step 104F to a list for full resolution investigation. Note that if the above-described process (i.e., steps 102 and 104) were performed on a full resolution image, the process of the present invention could end here although step 110 (described below) could still be performed.

Assuming the original image was downsized at step 100, the next stage of the detection scheme is to investigate each initial object detection in full resolution. Accordingly, each detected object passing the above threshold measure test is returned or restored to full resolution at step 106. Then, step 108 applies a portion of the same procedures applied in step 104. Specifically, the processes of generating the background mask (step 104D) through computing the basic geometric features (step 104E) are repeated with the full resolution data associated with each of the detected objects. That is, using the basic geometric features from the downsized mode (i.e., centroid, orientation, length, and width), a background mask is again generated about the object. A two-dimensional surface of the background mask region is again generated with the same LSE piecewise overlapping line segment method. The background mask region is then thresholded into a binary region of object pixels or background pixels using the same procedure as before. Finally, the object is then segmented, enumerated and has its basic geometric features computed using the same techniques as described above.

Instead of applying the detection threshold measure used in the initial object detection, the object descriptions generated at step 108 are filtered at step 110 based on their outer boundary shape. For example, in terms of trying to distinguish between mine-like and non-mine-like objects, the present invention can evaluate the irregularity of an object's outer boundary. An irregular outer boundary is generally indicative of a non-mine-like object (e.g., coral, sand patch, debris, etc.), whereas a regularly-shaped outer boundary is generally indicative of a mine-like object. Accordingly, in the case of detecting mine-like objects, step 110 can be realized by a test that might measure irregularity of the outer boundary of the detected object. This could be accomplished by selecting pixels on the detected object's boundary and examining pixels falling therebetween. If a certain number of these pixels between boundaries are background pixels, it can be assumed that the outer boundary of the object joining the two selected pixels is concave. Conversely, if a certain number of the pixels between boundaries are outer boundary pixels, it can be assumed that the outer boundary of the object joining the two selected pixels is convex. A certain measure of concavity or convexity can be used to filter out non-mine-like objects.

The final step (i.e., step 112) of the present invention involves saving those objects that survive the filtering process just described. Descriptions of the saved objects can be used to generate a display or printout that essentially shows only pixels (clustered as objects) satisfying all of the criteria described herein.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed is:

1. A method of detecting objects in an image, comprising the steps of:

providing an image defined by an array of pixels, each pixel from said array having an original value indicative of intensity;

providing a first mask defined by two spaced-apart strip regions wherein a target region is defined between said two strip regions;

applying, at each said pixel, a best fit criteria to a portion of said image defined by said first mask for a plurality of orientations of said first mask wherein said pixel is located within said target region for each of said plurality of orientations, said best fit criteria normalizing a mean square error of pixel intensities contained by said two strip regions by a mean square error of pixel intensities of said target region to generate a least squares error estimate for each of said plurality of orientations;

wherein a best fit is indicated by a smallest least squares error estimate;

generating, at each said pixel, an anomaly image defined by anomaly image pixels in correspondence with said array of pixels, wherein each said anomaly image pixel has a value defined as a difference between (i) said original value associated with a corresponding one of said array of pixels, and (ii) said smallest least squares error estimate;

convolving said anomaly image with a second mask of a selected size and shape wherein convolution values are generated across said anomaly image, said convolution values that are greater than a threshold value being indicative of the presence of an object of interest in a region of said anomaly image, wherein one of said anomaly image pixels associated with a greatest one of said convolution values in said region is defined as a centroid of the object of interest;

determining outer edges associated with the object of interest wherein a segmented object is defined by said outer edges with all pixels within said outer edges being assigned the same value;

determining geometric features of said segmented object; and comparing said geometric features of said segmented object with selected threshold features to determine if said geometric features correlate with said selected threshold features;

wherein the method of further comprising the steps of;

restoring each said segmented object that correlates with said selected threshold features at said step of comparing to the full resolution of the electro-optic identification sensing system to generate corresponding full resolution objects;

determining outer edges of each full resolution object;

and determining a shape defined by said outer edges of each said full resolution object wherein said shape is indicative of one of a regularly-shaped object and an irregularly-shaped object;

wherein said image is produced by an electro-optic identification sensing system, and wherein said image is provided at a resolution that is less than the full resolution of the electro-optic identification sensing system.

2. A method according to claim 1 wherein said image is produced by an electro-optic identification sensing system, and wherein said image is provided at the full resolution of the electro-optic identification sensing system.

3. A method according to claim 1 wherein said image is produced by an electro-optic identification sensing system, and wherein said image is provided at a resolution that is less than the full resolution of the electro-optic identification sensing system.

4. A method according to claim 1 wherein each of said two strip regions is defined by a rectangularly-shaped region.

5. A method according to claim 1 wherein each of said two strip regions is defined by a line segment.

6. A method according to claim 1 wherein said second mask is circular.

7. A method according to claim 1 wherein said second mask is rectangular.

8. A method of detecting objects in an image, comprising the steps of:

providing an image defined by an array of pixels, each pixel from said array having an original value indicative of intensity;

providing a first mask defined by two spaced-apart strip regions wherein a target region is defined between said two strip regions;

applying, at each said pixel, a best fit criteria to a portion of said image defined by said first mask for a plurality of orientations of said first mask wherein said pixel is located within said target region for each of said plurality of orientations, said best fit criteria normalizing a mean square error of pixel intensities contained by said two strip regions by a mean square error of pixel intensities of said target region to generate a least squares error estimate for each of said plurality of orientations, wherein a best fit is indicated by a smallest least squares error estimate;

generating, at each said pixel, an anomaly image defined by anomaly image pixels in correspondence with said array of pixels, wherein each said anomaly image pixel has a value defined as a difference between (i) said original value associated with a corresponding one of said array of pixels, and (ii) said smallest least squares error estimate;

convolving said anomaly image with a second mask of a selected size and shape wherein convolution values are generated across said anomaly image, said convolution values that are greater than a threshold value being indicative of the presence of an object of interest in a region of said anomaly image, wherein one of said anomaly image pixels associated with a greatest one of said convolution values in said region is defined as a centroid of the object of interest;

and determining size, shape and orientation of the object of interest using said centroid thereof;

the method of further comprising the steps of;

restoring each said segmented object that correlates with said selected threshold features at said step of comparing to the full resolution of the electro-optic identification sensing system to generate corresponding full resolution objects;

determining outer edges of each full resolution object;

and determining a shape defined by said outer edges of each said full resolution object wherein said shape is indicative of one of a regularly-shaped object and an irregularly-shaped object;

wherein said image is produced by an electro-optic identification sensing system, and wherein said image is provided at a resolution that is less than full resolution of the electro-optic identification sensing system.

9. A method according to claim 8 wherein said image is produced by an electro-optic identification sensing system, and wherein said image is provided at the full resolution of the electro-optic identification sensing system.

10. A method according to claim 8 wherein each of said two strip regions is defined by a rectangularly-shaped region.

11. A method according to claim 8 wherein each of said two strip regions is defined by a line segment.

12. A method according to claim 8 wherein said second mask is circular.

13. A method according to claim 8 wherein said second mask is rectangular.

* * * * *